United States Patent [19]

Sasaki et al.

[11] Patent Number: 4,581,748
[45] Date of Patent: Apr. 8, 1986

[54] QAM WITH DC BIAS IN ONE CHANNEL

[75] Inventors: Susumu Sasaki, Fujisawa; Hiroshi Nakamura, Sagamihara; Eisuke Fukuda, Yokohama, all of Japan

[73] Assignee: Fujitsu Limited, Kawasaki, Japan

[21] Appl. No.: 566,401

[22] Filed: Dec. 28, 1983

[30] Foreign Application Priority Data

Dec. 29, 1982 [JP] Japan .................................. 57-231634
Dec. 29, 1982 [JP] Japan .................................. 57-231635
Dec. 29, 1982 [JP] Japan .................................. 57-231636

[51] Int. Cl.[4] .......................... H03C 5/00; H04D 5/00
[52] U.S. Cl. ........................................ 375/39; 375/42; 375/81; 329/120; 329/135; 332/17
[58] Field of Search ............... 329/120, 124, 135; 332/17, 23 A; 375/39, 42, 43, 53, 54, 81, 86, 93; 455/46, 60

[56] References Cited

U.S. PATENT DOCUMENTS 3,311,442 3/1967 de Jager et al. .................. 455/60
3,343,093 9/1967 Van Gerwen .................... 375/39
3,378,771 4/1968 Van Gerwen et al. ........... 455/60

Primary Examiner—Robert L. Griffin
Assistant Examiner—Raymond C. Glenny
Attorney, Agent, or Firm—Staas & Halsey

[57] ABSTRACT

A radio communication system includes a transmitter unit, a transmission line, and a receiver unit. The transmitter unit modulates an in-phase-channel (I-ch) data signal and quadrature-channel (Q-ch) data signal with two carriers having a $\pi/2$ phase difference with each other. A DC offset is added to either one of the I-ch and Q-ch data signals before they are modulated. In the receiver unit, a demodulation operation is performed, for the received transmission signal, by a synchronous detection with the use of a leakage carrier created due to the DC offset and included in the transmission signal.

13 Claims, 19 Drawing Figures

QAM WITH DC BIAS IN ONE CHANNEL

BACKGROUND OF THE INVENTION

1. Field of the Invention

The present invention relates to a radio communication system.

2. Description of the Prior Art

In a radio communication system in which data is transmitted on a radio transmission line from a transmitter unit and the transmission data is demodulated and reproduced at a receiver unit, a carrier is digitally modulated according to data to be transmitted. A variety of methods have been proposed and put into practical use for such digital modulation. The present invention relates primarily to a quadrature amplitude modulation (QAM) method.

In a QAM radio communication system, the carrier is modulated in phase and, at the same time, in amplitude according to data to be transmitted. The data is thereby transmitted as one of many corresponding coded points arranged on an imaginary plane. This enables a large amount of data to be transmitted at one time and thus significantly increases the transmission capacity of a radio transmission line.

According to the QAM method, many coded points corresponding to data are created, as mentioned above. The number of coded points may be 16, 32, 64, and sometimes as much as 128 and so on. In the QAM method, one of the significant functions of the receiver unit is the recovery of a reference carrier from the transmission signal, which is used for a synchronous detection. That is, the thus recovered carrier is used to demodulate the transmission data and reproduce the orignal data.

The most frequently used QAM method is the 16-value method. In this case, a process identical to a known process under a typical 4-phase phase shift keying (PSK) method is usually utilized for recovering the reference carrier. That is, a so-called multiply method, such as a two-multiply or four-multiply method, may be used for realizing the process. In this case, there is further provided a phase selection control process in a reference carrier recovery circuit.

In the higher value QAM methods, such as the 16-value methods, a problem arises when using the prior art reference carrier recovery circuit, in suppressing so-called jitter (fluctuation) of the reference carrier. With 32, 64-, and 128-value QAM methods, recovery of a reference carrier for synchronous detection, with the use of a prior art reference carrier recovery circuit is impossible for all intents and purposes.

In view of the above, it is desired to realize a QAM radio communication system for a multivalue QAM method having a 32-value or higher.

SUMMARY OF THE INVENTION

Accordingly, it is an object of the present invention to provide a radio communication system operated under a QAM method having a 32-value or higher.

The above object is basically attained by the following. At a transmitter unit of the system, a direct current (DC) offset is added to either one of the in-phase channel and quadrature channel data to be transmitted. A carrier leakage is thereby created in the modulation signal. At a receiver unit of the system, a leakage carrier is extracted from the received modulation signal. The reference carrier is recovered by using the extracted leakage carrier. The original data is then demodulated and reproduced by using the recovered reference carrier.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
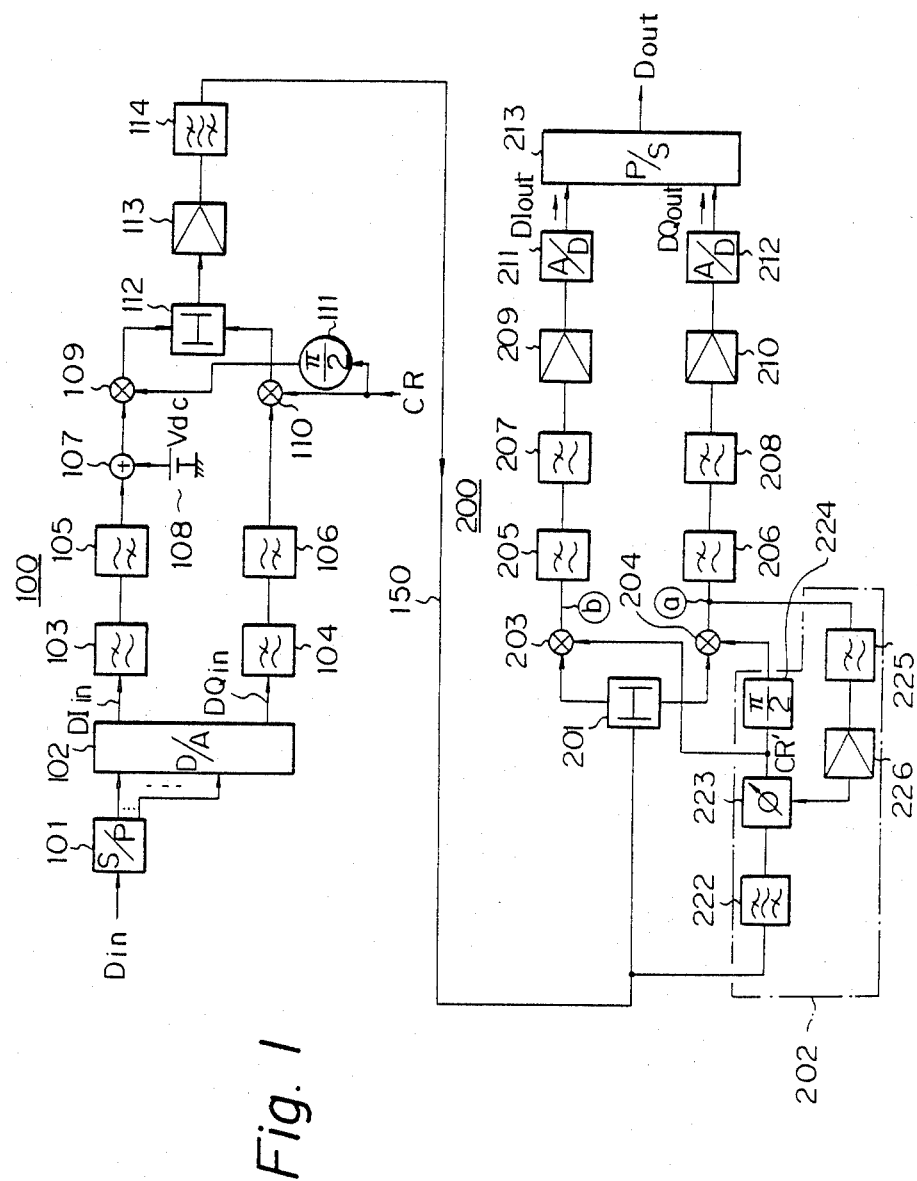
FIG. 1 is a block diagram of a radio communication system according to a first embodiment of the present invention.

FIG. 1 is a block diagram of a radio communication system according to a first embodiment of the present invention. In FIG. 1, reference numeral 100 represents a transmitter unit, 200 a receiver unit, and 150 a transmission (radio wave) line connecting the two. A transmission data signal $D_{in}$ coded by, for example, pulse code modulation (PCM) is supplied to an input stage of the transmitter unit 100 and then transformed, via a serial/parallel converter (S/P) 101, into a parallel data signal. The parallel data signal is further transformed, via a digital/analog converter (D/A) 102, into an analog data signal. Furthermore, taking as an example a 64-value QAM, the analog data signal is divided into two route signals each composed of 3-bit signals. Thus, two route analog signals $DI_{in}$ and $DQ_{in}$ are produced therefrom, each expressing $8(=2^3)$ values of data. The signal $DI_{in}$ is the so-called in-phase (I)-channel (ch) data signal. The signal $DQ_{in}$ is the so-called quadrature (Q)-channel(ch) data signal. The I-ch data signal $DI_{in}$ and the Q-ch data signal $DQ_{in}$ are transferred to a hybrid circuit (H) 112 by way of low-pass filters 103 and 104 for shaping individual transmission spectrums and by way of high-pass filters 105 and 106, respectively. In this case, only one of the two route analog signals, for example, the signal $DI_{in}$, is transferred through an adder 107.

The adder 107 and a direct current (DC) offset source 108 cooperating therewith are new members never before seen in prior art systems. A DC offset $V_{dc}$ is given to either one of the quadrature signals ($DI_{in}$, $DQ_{in}$). The signals from the adder 107 and the filter 106 are applied to mixers 109 and 110, respectively. A carrier CR is given, on one hand, to the mixer 110 directly and, on the other hand, to the mixer 109, via a $\pi/2$ phase shifter 111. Thus, a modulation operation is performed by each of the mixers 109 and 110 with individual analog data signals. The quadrature signals of the two routes are added to each other at the hybrid circuit 112. The added signal is then amplified by an intermediate frequency amplifier 113, and the desired frequency band component of the signal is extracted by a band-pass filter 114. The filtered signal is then amplified to a predetermined transmission level by means of a high power transmission amplifier (not shown). The amplified signal is transmitted, via the transmission line 150, to the receiver unit 200.

At the receiver unit 200, the transmitted signal is received and then divided by a hybrid circuit 201 into two route signals. The two route signals are demodulated by mixers 203 and 204, respectively. For the demodulation operation, synchronous detection is achieved with a which carrier CR' is supplied from a carrier recovery circuit 202. The carrier recovery circuit 202 is also a new member never before seen in prior art systems and is closely related in operation to the DC offset source 108 in the transmitter unit 100. The thus demodulated two route receiving signals are transferred to individual analog/digital converters (A/D) 211 and 212, via low-pass filters 205 and 206, low-pass filters 207 and 208, and base band amplifiers 209 and 210, respectively. Thus, an I-ch digital data signal $DI_{out}$ and a Q-ch digital data signal $DQ_{out}$ are obtained at the outputs of the converters 211 and 212, so that the original data can be reproduced as a receiving data signal $D_{out}$, by way of a parallel/serial converter (P/S) 213.

The carrier recovery circuit 202, mentioned earlier, comprises, for example, a leakage carrier extracting filter 222, a variable phase shifter 223, a $\pi/2$ phase shifter 224, a low-pass filter 225, and a DC amplifier 226. The circuit 202 and also the DC offset source 108 are, as previously mentioned, new. These two elements will be explained in detail immediately below.

Figure 2:
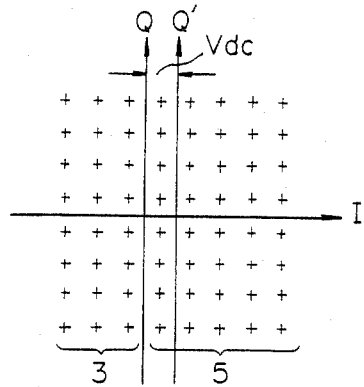
FIG. 2 is a schemtic pattern view of the distribution of coded points of I-ch and Q-ch data.

FIG. 2 is a schematic pattern view of the distribution of coded points of I-ch and Q-ch data. In FIG. 2, the ordinate I represents the I-ch, and the abscissa Q the Q-ch, with a 64-value QAM as an example. The character Q' indicates the location of an axis which would be located in a conventional 64-value QAM. The axis Q' is, however, offset by $V_{dc}$ to become the axis Q, because the DC offset $V_{dc}$ of the DC offset source 108 is added to the I-ch data signal.

Usually, signal components defined by the coded points of a right side phase with respect to a central axis Q' and signal components defined by the coded points of the left side phase would occur with almost the same probability, because coded points of 64 values generally occur quite randomly. As a result, there is generally no possibility that the carrier component will be in only one particular direction when the coded points occur randomly in the plane defined by both the axis Q' and the axis I.

On the other hand, if the offset $V_{dc}$ is forcibly added to the I-ch data signal so as to shift the usual axis Q' to the axis Q of the present invention, the signal components of the right side phase, with respect to the center axis Q, and the signal components of the left side phase occur at an unbalanced ratio of 5:3, as shown in FIG. 2. Therefore, a relative surplus level of 2(=5−3) is provided, and the aforesaid leakage carrier can always be obtained. As a result, a carrier can always be in the modulated transmission signal.

Figure 3:
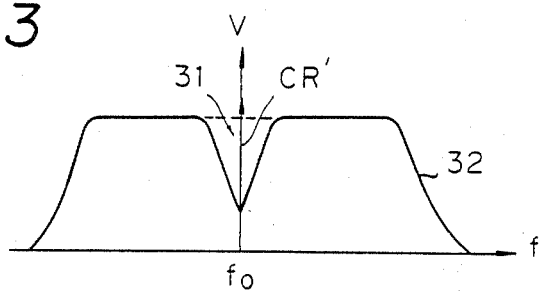
FIG. 3 is a graph of a spectrum of the output from a transmitter unit shown in FIG. 1.

FIG. 3 is a graph of a spectrum of the output from the transmitter unit 100 shown in FIG. 1. The ordinate f indicates a frequency, and the abscissa V a voltage. Usually, the output from the transmitter unit 100, i.e., the modulated transmission signal, exhibits a flat characteristic at the middle of the spectrum, as illustrated by the broken line in the graph. Therefore, no carrier can be observed. If, however, the DC offset $V_{dc}$ is added to the data signal, the leakage carrier CR' is at the middle of the spectrum. That is, the carrier component also appears in the modulated transmission signal. In this case, the signal components existing in the vicinity of the leakage carrier CR' are preferably filtered by means of the high-pass filters 105 and 106 of FIG. 1 (refer to a V-shaped recess 31 of the spectrum) in order to easily pick up the leakage carrier CR'. The thus filtered signal components are recovered, in the receiver unit 200, by the low-pass filters 207 and 208. Incidentally, the low-pass filters 103 and 104 in the transmitter unit 100 are inherent and conventional in this kind of radio communication system for restricting the frequency band of the data signals to be dealt with. Also, the low-pass filters 205 and 206 in the receiver unit 200 are inherent and conventional in this kind of radio communication system for extracting the desired base band signal only.

Figure 4:
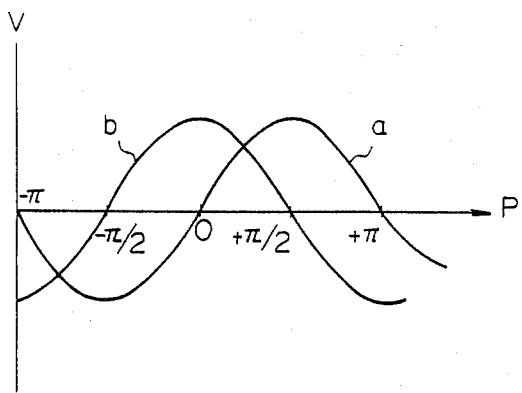
FIG. 4 is a waveform diagram for explaining a carrier recovery circuit of FIG. 1.

FIG. 4 depicts waveforms for explaining the carrier recovery circuit 202 of FIG. 1. In the graph, the ordinate P represents the phase and the abscissa V the voltage. A sine curve a and a cosine curve b respectively represent the waveforms of signals appearing at portions ⓐ and ⓑ.

Returning to FIG. 1 again, the leakage carrier is extracted by the leakage carrier extracting filter 222. Then, phase control is effected by the variable phase shifter 223 to the thus extracted leakage carrier so as to attain optimum synchronous detections at the individual mixers 203 and 204. The thus phase-controlled carrier CR' is supplied directly the mixer 203 and to the mixer 204 with a phase shift of $\pi/2$ by the $\pi/2$ phase shifter 223. Thus, the carrier CR' is used for the I-ch and Q-ch synchronous detection operations at the mixers 203 and 204 with the modulated transmission signal received through the hybrid circuit 201, which branches the modulated transmission signal into two route modulated transmission signals and input into the mixers 203 and 204. The waveforms of FIG. 4 specifically represent the in phase characteristics of the thus synchronously detected signals, where the optimum phase is obtained at the phase 0 of the sine curve a when the sine value indicates zero voltage. Accordingly, feedback control is given, via the low-pass filter 225 and the DC amplifier 226, to the variable phase shifter 223 in such a manner as to maintain the voltage at the portion ⓐ at zero. At this time, the voltage at the portion ⓑ becomes maximum. The voltage at the portion ⓐ represents an output voltage corresponding to the route signal to which the aforesaid DC offset $V_{dc}$ is not added in the transmitter unit 100.

The output from the mixer 204 is the base band signal. However, the base band signal necessarily contains a sine wave signal (a) having a very low frequency due to a beat signal between an inherent carrier component and the extracted leakage carrier component. The sine wave signal (a) is extracted by means of the low-pass filter 225 and fed back, via the amplifier 226, to the phase shifter 223 until the sine wave value (a) is made zero.

As explained above, the hardware for constructing the carrier recovery circuit 202 can be significantly simplified compared with the hardware in the prior art multiply method for demodulation. This is because of the use of the leakage carrier derived from the DC offset. Further, it is recognized that the system of FIG. 1 is operated under the so-called absolute phase modulation method, i.e., the modulation signal having the same phase as that of the carrier is allotted to be data "0" or "00" fixedly. It is known that the absolute phase modulation method is available for decreasing a data error rate.

Figure 5:
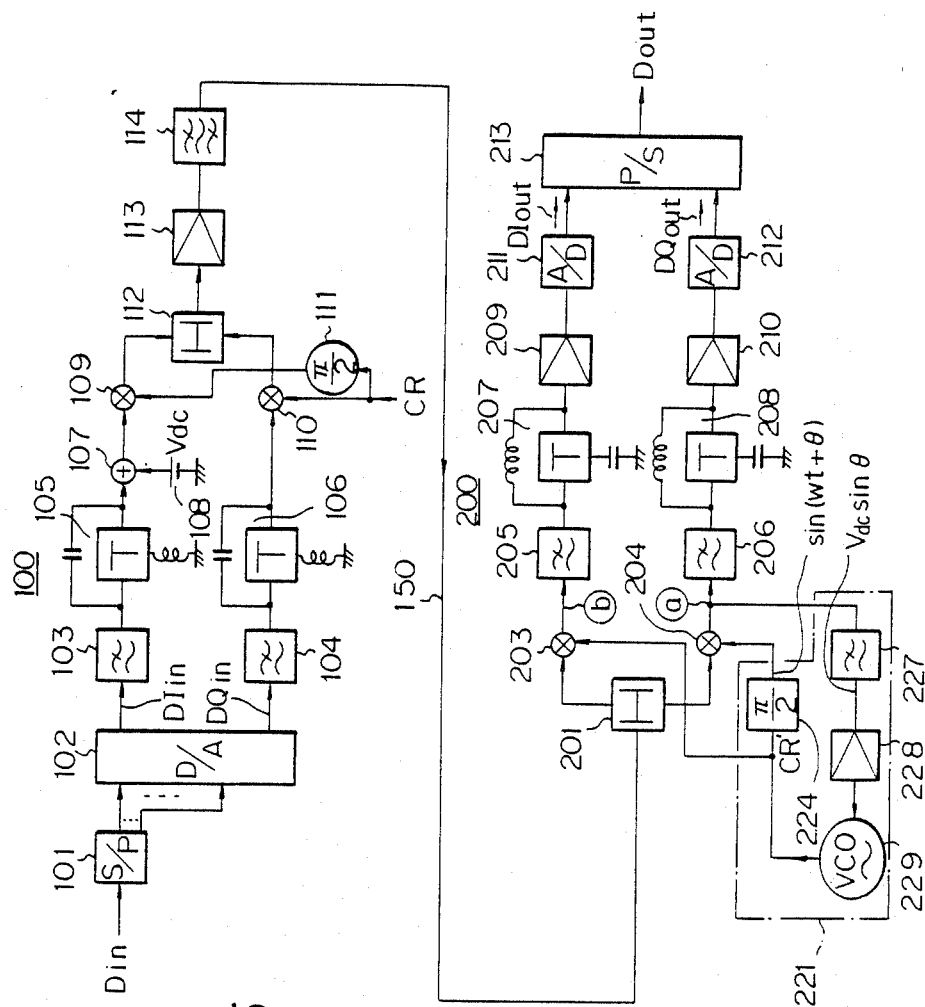
FIG. 5 is a block diagram of a radio communication system according to a second embodiment of the present invention.

Another arrangement instead of the carrier recovery circuit 202 can also be used for the receiver unit 200. FIG. 5 is a block diagram of a radio communication system according to a second embodiment of the present invention. The difference here is only that a carrier recovery circuit 221 does not contain the leakage carrier extracting filter 222 and the variable phase shifter 223, as in the related circuit 202 of the first embodiment. Therefore, the carrier recovery circuit 221 does not positively extract the leakage carrier CR', as in the corresponding circuit 202, but indirectly utilizes the leakage carrier for the synchronous detections in the mixers 203 and 204.

The reason why the synchronous detections can be achieved without extracting the leakage carrier CR' is as follows. The output from the filter 114 of the transmitter unit 100 is expressed by equation (1).

$$f(t) = (V_{dc} + x(t))\cos\omega t + y(t)\sin\omega t \quad (1)$$

where, the symbol x(t) denotes a component of the I-ch data signal $DI_{in}$ and the symbol y(t) a component of the Q-ch data signal $DQ_{in}$. The cos $\omega t$ component and sin $\omega t$ component are given at the mixers 109 and 110, respectively. The signal f(t) is applied, in the receiver unit 200, to the mixers 203 and 204 and demodulated with the sin $(\omega t + \theta)$ component. Thus, a signal of f(t) sin $(\omega t + \theta)$ is obtained at the portion ⓐ, which is expressed as follows:

$$f(t)\sin(\omega t + \theta) = (V_{dc} + x(t))\cos\omega t \sin(\omega t + \theta) + \quad (2)$$
$$y(t)\sin\omega t \sin(\omega t + \theta)$$

$$= (V_{dc} + x(t)) \cdot \frac{1}{2}(\sin(2\omega t + \theta) + \sin\theta) -$$

$$y(t) \cdot \frac{1}{2}(\cos(2\omega t + \theta) - \cos\theta)$$

where, the symbol $\theta$ denotes a phase difference between the inherent carrier component and the leakage carrier component. The signal components of $2\omega t$ in equation (2) are cancelled by a low-pass filter 227. Therefore, the signal f(t) sin $(\omega t + \theta)$ is transformed to $\frac{1}{2}(V_{dc}+x(t))\sin\theta + \frac{1}{2}y(t)\cos\theta$. The first expression, i.e., $\frac{1}{2}(V_{dc}+x(t))\sin\theta$, indicates the component of the I-ch data signal $DI_{out}$, and the second expression, i.e., $\frac{1}{2}y(t)\cos\theta$, indicates the component of the Q-ch data signal $DQ_{out}$. The filter 227 can also cancel the signal components of x(t) and y(t). Then, only the output $V_{dc}\sin\theta$ is given from the filter 227. The $V_{dc}\sin\theta$ term is a leakage component. The $V_{dc}\sin\theta$ term can be reduced to zero, i.e., $\theta \rightarrow 0$, when the inherent carrier component (sin $\omega t$) becomes in phase with the leakage carrier component (sin $(\omega t+\theta)$). Accordingly, the output $V_{dc}\sin\theta$ from the filter 227 is supplied, via an amplifier 228, to a control terminal of a voltage-controlled oscillator (VCO) 229 so as to lead the phase $\theta$ to zero. The oscillation frequency of the oscillator 229 is adjusted, in advance, to be at an optimum frequency when $V_{dc}\sin\theta = 0$ stands. Thus, the carrier recovery circuit 221 operates as a so-called phase-locked loop (PLL) circuit under control of the DC component ($V_{dc}\sin\theta$) so as to minimize the phase to zero.

It should be noted that the DC component is obtained from either one of the two route signals to which no DC offset is added in the transmitter unit 100. Further, the carrier recovery circuit 221 has an advantage in that no leakage carrier extracting filter, such as the 222 of FIG. 1, is needed, which filter is usually very expensive due to the requisite high quality factor (Q). Furthermore, the circuit 221 has another advantage in that optimum synchronous detection can be maintained even though the frequency of the leakage carrier deviates slightly from a nominal value, because no high Q filter is used therein.

Referring to FIG. 3 again, the V-shaped recess 31 is formed in the middle of the spectrum 32 representing the modulated transmission signal component, for the purpose of clear separation between the leakage carrier CR' and the modulated transmission signal. That is, signal components of a relatively narrow frequency band including the carrier CR' therein must be suppressed, in advance, to some extent. To suppress narrow frequency band including the carrier CR', in FIGS. 1 and 5, the high-pass filters 105 and 106 are introduced in the transmitter unit 100.

However, although the filters 105 and 106 are advantageous in view of the above-mentioned clear separation between CR' and the transmission signal, there is, conversely, a certain disadvantage in that the low frequency components of the I-ch and Q-ch data signals are largely filtered off unintentionally. This necessarily causes, in the receiver side, an increase of data error in the reproduced data signals $DI_{out}$ and $DQ_{out}$. In this case, an incompatible relationship exists in that, if a filtering frequency, i.e., a cut-off frequency, of the low frequency components is raised, the data of the transmission signal is remarkably deteriorated. Conversely, if the filtering frequency is lowered, while the data deterioration is improved, the S/N ratio of the leakage carrier CR' is deteriorated. In the latter case, i.e., the filtering frequency is lowered, a considerably complicated carrier recovery circuit may be necessary.

It should be recognized that, in the receiver unit 200, the high-pass filters 207 and 208 (FIGS. 1 and 5) function to increase the level of the low frequency components which are suppressed, relative to the level of the frequency components which are not suppressed, of the transmission signal. These low-pass filters 207 and 208 are preferably designed so that each has an inverse transfer function H'(j$\omega$) of a transfer function H(j$\omega$) of each of the high-pass filters 105 and 106. This relative inverse relationship will be expressed as follows. That is, assuming that $$H(j\omega) = A(\omega)e^{jB(\omega)}$$

$$H'(j\omega) = A'(\omega)e^{jB'(\omega)} \qquad (3)$$

stand and, at the same time, $$A(\omega) = \frac{1}{A'(\omega)} \qquad (4)$$

$$B(\omega) = -B'(\omega)$$

are satisfied, $$H(j\omega) \times H'(j\omega) = 1 \qquad (5)$$

is obtained, where the symbols $A(\omega)$ and $A'(\omega)$ represent amplitude components and $B(\omega)$ and $B'(\omega)$ represent phase components of the signals passing through the respective filters. It should be understood that equation (5) reveals the relative inverse characteristics between the transfer function of each low-pass filter (207, 208) and that of each high-pass filter (105, 106).

Figure 6:
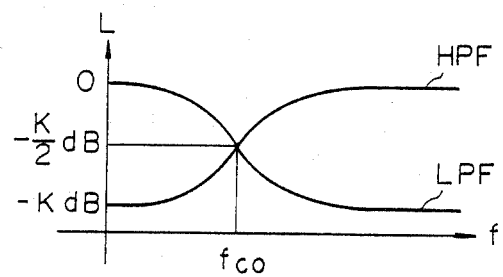
FIG. 6 is a graph of the transfer function characteristics of the filters.
Figure 7:
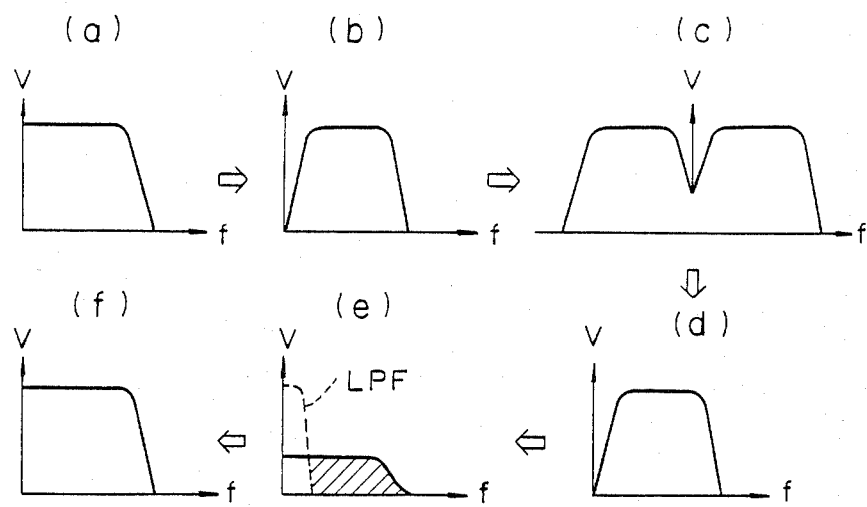
FIGS. 7(a)–7(f) are graphs of frequency spectrums of major signals appearing along the order of the signal flow from the transmitter unit to the receiver unit.

FIG. 6 is a graph of the transfer function characteristics of the filters (105, 106, 207, 208). The ordinate f denotes a frequency and the abscissa L an output level of the concerned filters. The symbol, HPF (high-pass filter) represents the transfer function curve of each of the high-pass filters 105 and 106 in the transmitter unit 100, and LPF (low-pass filter) represents the transfer function curve of each of the low-pass filters 207 and 208 in the receiver unit 200. Since the relative inverse characteristics exist, regarding the transfer functions, the output levels L of the curves HPF and LPF reach the same level of $-K/2$ dB at the cross-over frequency $f_{co}$ therebetween, when the lowest level of the curve HPF is assumed as $-K$ dB. If such relative inverse characteristics cannot be satisfied, undesired distortion of data is inevitably created during the data reproduction in the receiver side.

FIGS. 7(a)–(f) shows graphs of frequency spectrums of major signals appearing along the order of the signal flow from the transmitter unit 100 to the receiver unit 200. In each graph, the ordinate V indicates a voltage level of the signal and the abscissa f a frequency thereof. Graph (a) represents the transmission spectrum of the data signal $DI_{in}$ (same as $DQ_{in}$). The spectrum of graph (a) is transformed to that of graph (b) by means of the high-pass filter 105 (same as the filter 106). Thereafter, the output signal from the filter 105 is modulated at the mixer 109 (same as the mixer 110) so that the spectrum of the graph (c) is obtained at the output of the filter 114, which is substantially the same as the graph of FIG. 3. In the receiver unit 200, the transmission signal is demodulated by the mixer 203 (same as the mixer 204) to produce the spectrum of the graph (d) at the output of the filter 205 (206). Further, in the low-pass filter 207 (same as the filter 208), the level of the low frequency component is suppressed before the level of the low frequency component in the transmitter unit 100 is relatively increased. The term "relatively" means that the high frequency component side of the signal is suppressed as illustrated by the hatching area in graph (e), which corresponds to the output of the filter 207 (210). The broken line curve LPF represents a filtering characteristic of the low-pass filter. Finally, the signal from the filter 207 (208) is amplified to produce the spectrum of graph (f), which represents the spectrum of the reproduced base band signal. The amplification of the signal is achieved by the base band amplifier 209 (210).

Figure 8:
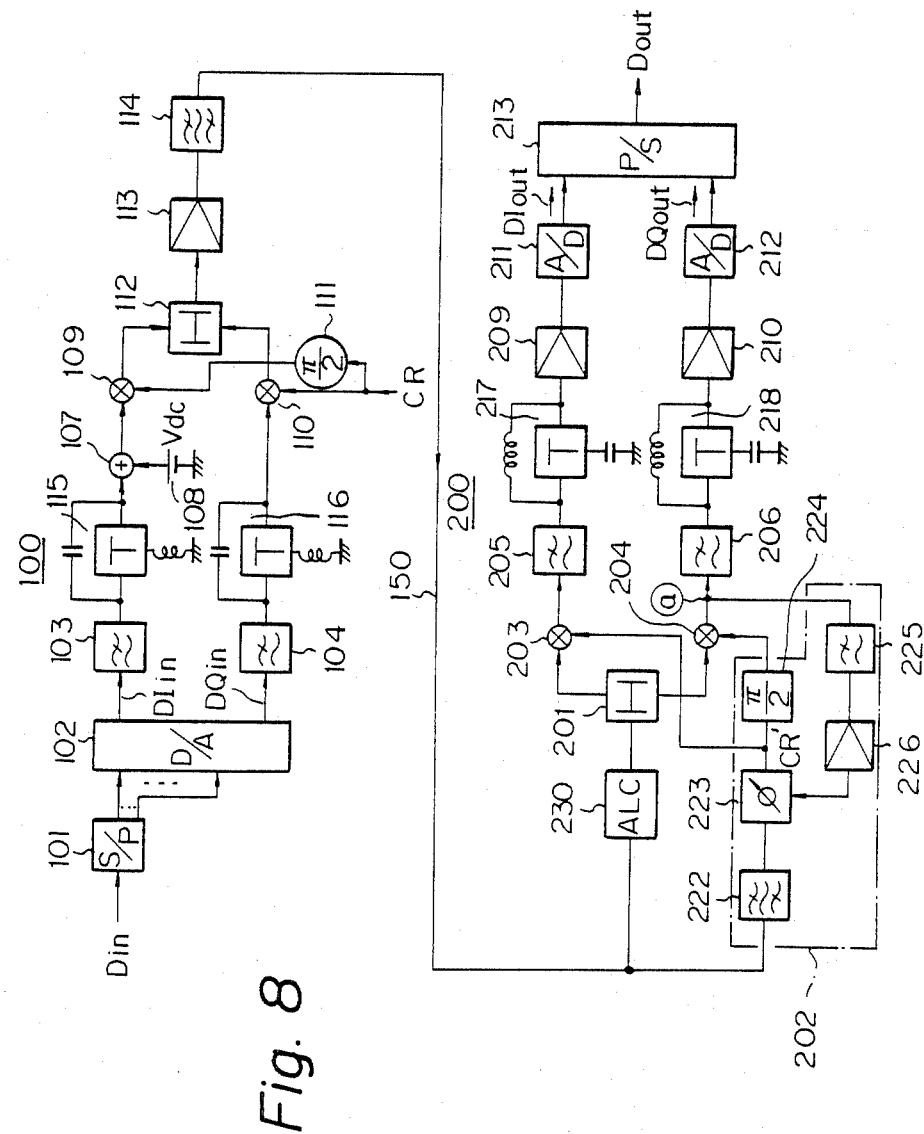
FIG. 8 is a block diagram of a modified radio communication system, based on the first embodiment according to the present invention in FIG. 1.

FIG. 8 is a block diagram of a modified radio communication system, based on the first embodiment of FIG. 1, according to the present invention. Attention should be paid here that a high-pass filter 115 (corresponding to the filter 105) and a low-pass filter 217 (corresponding to the filter 207) have inverse characteristic transfer functions, relative to each other, conforming to equation (5). Similarly, a high-pass filter 116 (corresponding to the filter 106) and a low-pass filter 218 (corresponding to the filter 208) have inverse characteristic transfer functions, relative to each other, conforming to equation (5).

Figure 9:
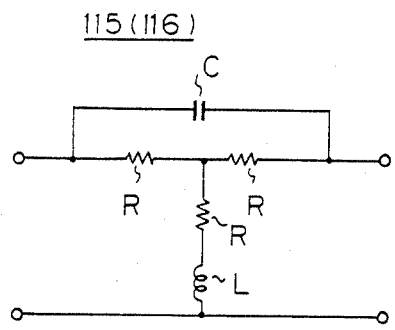
FIG. 9 is a detailed circuit diagram of a high-pass filter shown in FIG. 8.
Figure 10:
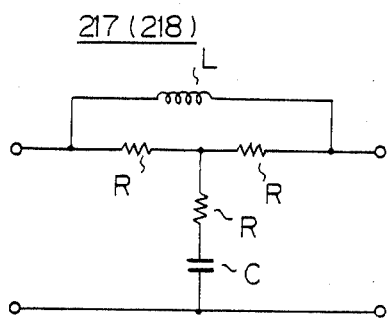
FIG. 10 is a detailed circuit diagram of a low-pass filter shown in FIG. 8.

FIG. 9 is a detailed circuit diagram of an example of the high-pass filter 115 (116) shown in FIG. 8. FIG. 10 is a circuit diagram of a detailed example of the low-pass filter 217 (218) shown in FIG. 8. In both figures, symbol C indicates a capacitor, R a resistor, and L a coil. It is also possible to utilize a so-called active filter using an operational amplifier, instead of the passive filter (C, R, L). The above explanations with reference to FIGS. 8, 9, and 10, are made relying on the first embodiment. It is a matter of course, that the same explanations also apply to the second embodiment.

Returning to FIG. 7 again, especially referring to the change from graph (e) to (f), it is required that the related signal be amplified as high as, for example, several tens of dB. In order to obtain this high amplification, the base band amplifier 209 (same as the amplifier 210) in FIG. 1 (also FIG. 5) must be fabricated, in actuality, as a multi-stage amplifier connected in cascade. That is, although the data distortion can be improved by a combination of the high-pass filter (115, 116) and the low-pass filter (217, 218), an amplifying operation as high as several tens of dB is required in the receiver unit 100. Referring again to the change from graph (d) to (e), it is apparent that the level of the related signal is decreased due to the presence of the low-pass filter 217 (same as the filter 218). Therefore, it is preferable to bring an amplifying function into the process of graph (e), so that the amplifying function of graph (f) may substantially be removed from the receiver unit 200. To be specific, it is preferable to employ a feedback amplifier which has both a low-pass filtering function and exhibits an inverse characteristic relative to the characteristic by the high-pass filter 115 (116), thereby allowing the low-pass filter 217 (218) to be substantially eliminated from the receiver unit 200. In this case, it is sufficient that the feedback amplifier be a single-stage amplifier and not a multi-stage amplifier connected in cascade.

Figure 11:
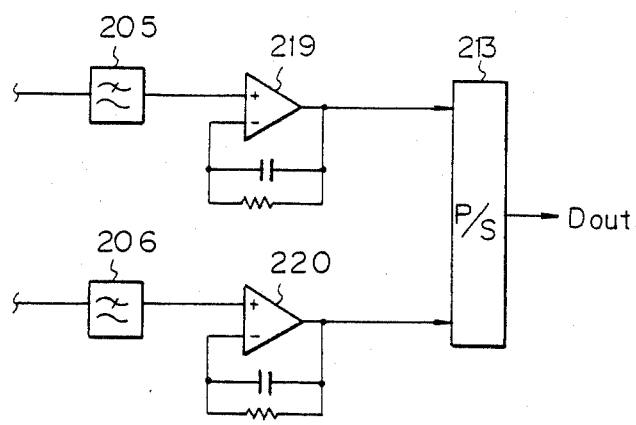
FIG. 11 is a circuit diagram of a modified receiver unit shown in FIG. 8.

FIG. 11 is a circuit diagram of part of a modification of the receiver unit 200 shown in FIG. 8. The feedback amplifier is referenced by numeral 219, instead of the combination of the members 217 and 209, and by numeral 220, instead of the members 218 and 210. As with the system of FIG. 8, the system with the receiver unit of FIG. 11 can minimize deterioration of data.

Figure 12:
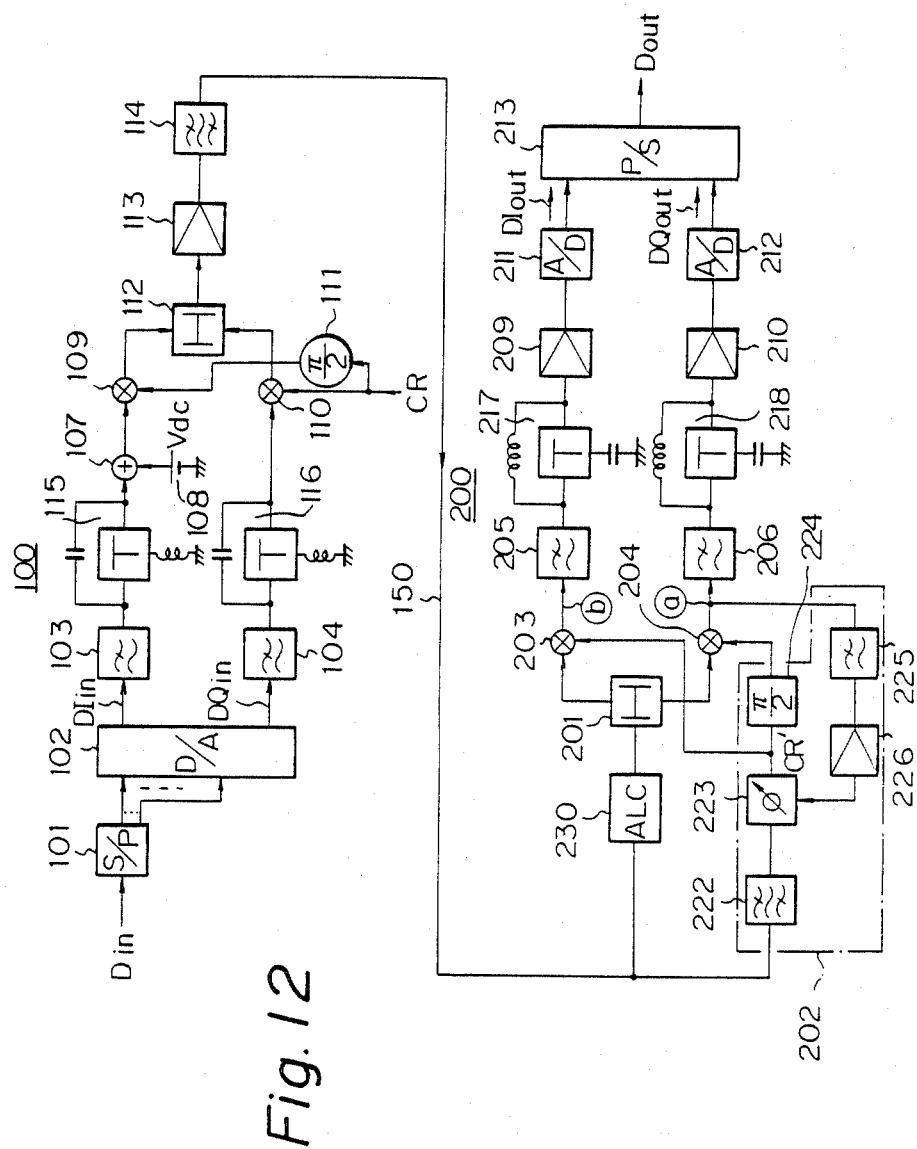
FIG. 12 is a block diagram of a radio communication system shown in FIG. 1, to which an automatic level control (ALC) circuit is added.
Figure 13:
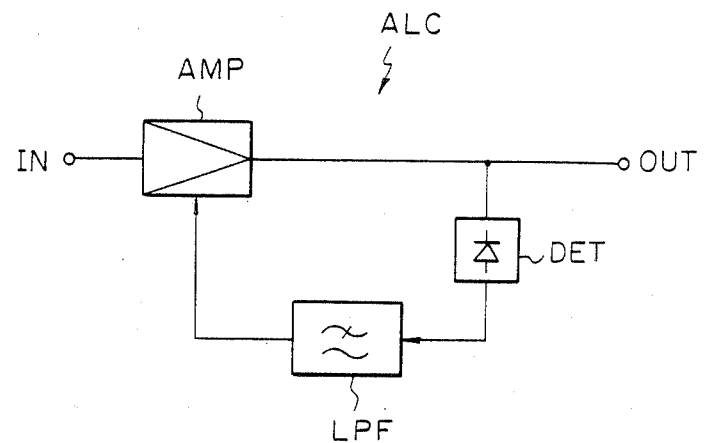
FIG. 13 is a block diagram of a conventional ALC circuit.

Finally, automatic level control (ALC), i.e., so-called AGC, will be mentioned below. ALC is usually introduced in an input stage of a receiver unit. ALC is especially important for the receiver unit, particularly the receiver unit connected to a transmission line having considerably poor transmission quality. FIG. 12 is a block diagram of a radio communication system shown in FIG. 1 but further including an ALC circuit. The ALC circuit is referenced by numeral 230. In the prior art, an ALC circuit is conventionally formed of a variable gain amplifier, a filter for extracting a low frequency component from the output of the variable gain amplifier, a detector for detecting the output from the filter, and a DC amplifier. FIG. 13 is a circuit diagram of a conventional ALC circuit. The conventional members are specifically illustrated as the variable gain amplifier AMP, the detector DET, and the low-pass filter LPF. The ALC circuit of FIG. 13 functions as a so-called self-controlled circuit. Therefore, the ALC is performed with an average power of the received signal via the transmission line. Accordingly, it is not easy to perform a precise ALC operation. In the system of the present invention, another ALC circuit construction can be realized with the use of the mixer 203. The mixer 203 operates with a function equivalent to that of the detector DET (FIG. 13) in addition to its inherent demodulation function. The mixers 203 and 204 achieve synchronous detection for the carrier component CR with phase differences of 0 and $\pi/2$, respectively. Thus, as previously explained, the sine wave curve a and the cosine wave curve b (refer to FIG. 4) are seen constantly at the portions ⓐ and ⓑ (FIG. 8), respectively, after completion of the synchronization with the carrier component CR. The synchronous detection is performed in such a manner as to trace the point of the phase 0 along the sine wave curve a (FIG. 4). Conversely, at the phase 0, the level of the cosine wave curve b reaches its maximum. This means that the output of the mixer 203, at the portion ⓑ always provides a peak level of the received signal. Therefore, it is considered that the ALC function can also be performed by tracing the peak level.

Figure 14:
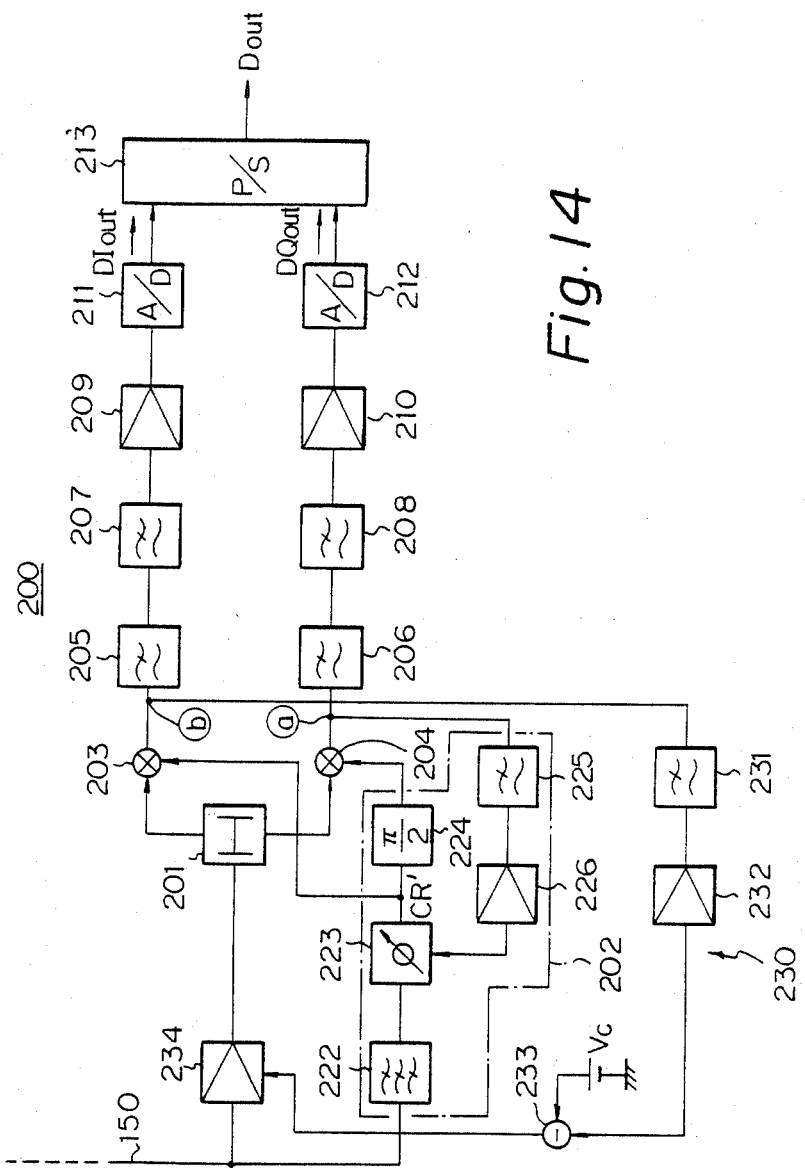
FIG. 14 is a detailed block diagram of an ALC circuit in the receiver unit shown in FIG. 12.

FIG. 14 is a detailed block diagram of an ALC circuit 230 in the receiver unit 200 shown in FIG. 12. As seen from FIG. 14, the ALC circuit 230 is comprised of a low-pass filter 231, a DC amplifier 232, a subtractor 233, and a variable gain amplifier 234. The output from the mixer 203 is the base band signal. However, the base band signal necessarily contains a cosine wave signal (b) having very low frequency due to a beat signal between an inherent carrier component CR and the leakage carrier component CR'. The cosine wave signal (b) is extracted by means of the low-pass filter 231. The output from the filter 231 is DC amplified by the DC amplifier 232. The output from the amplifier 232 therefore varies in level in accordance with the level of the received transmission signal. At the same time, the output level of the amplifier 232 also varies with respect to a reference gain control voltage $V_c$. Accordingly, the variation of the received signal level can be detected as an output from the subtractor 233, which produces a level difference between the output of the amplifier 232 and the reference voltage $V_c$. Based on the thus detected level variation, the amplifier 234 is gain controlled so as to achieve the ALC operation. The ALC circuit is applicable not only to the receiver unit 200 of the first embodiment as disclosed above, but also to that of the second embodiment.

As explained above in detail, the present invention can provide a radio communication system operated under a multivalue QAM method, which is commercially available, even with a multivalue of 32 or higher.

We claim:

1. A radio communication system, operatively connected to receive an in-phase (I-ch) channel data signal and a quadrature-channel (Q-ch) data signal and two carriers having a phase difference of $\pi/2$ with respect to each other, and including a transmission line and a carrier recovery circuit operated under a quadrature amplitude modulation (QAM) method, said radio communication system comprising:

a transmitter unit, operatively connected to receive the in-phase channel (I-ch) and quadrature channel (Q-ch) data signals, for modulating the two carriers in accordance with the in-phase channel (I-ch) data signal and the quadrature-channel (Q-ch) data signal, for adding the modulated signals to each other, and for transmitting a transmission signal to the transmission line, said transmitter unit comprising:
  a direct current (DC) offset source, having a DC offset, operatively connected to receive the I-ch or Q-ch data signals;
  an adder, operatively connected to said DC offset source, for adding the DC offset to only one of the I-ch and Q-ch data signals;
  a first high-pass filter, operatively connected to receive the I-ch data signal and having a first characteristic transfer function, for filtering the I-ch data signal; and
  a second high-pass filter, operatively connected to receive the Q-ch data signal and having a second characteristic transfer function, for filtering the Q-ch data signal, said first and second high-pass filters forming a V-shaped recess, in the vicinity of the leakage carrier, in the spectrum of the transmission signal; and a receiver unit, operatively connected to receive the transmission signal via the transmission line, for separating the transmission signal into a first receiving signal representing the I-ch data signal and a second receiving signal representing the Q-ch data signal, for demodulating the first and second receiving signals from the two carriers having the phase difference of $\pi/2$ with respect to each other, the carriers being output from the carrier recovery circuit, and for reproducing original data signals from the demodulated signals, said receiver unit generating a leakage carrier due to said DC offset, the leakage carrier being phase controlled and transformed into two transformed leakage carriers having a phase difference of $\pi/2$ with respect to each other in said carrier recovery circuit, said two transformed leakage carriers applied to the first and second receiving signals, respectively, for providing a demodulation operation by synchronous detection of said first and second receiving signals, said receiver unit comprising:
  a first low-pass filter, operatively connected to receive the I-ch data signal, for outputting a first signal; and
  a second low-pass filter, operatively connected to receive the Q-ch data and operatively connected to said first and second high-pass filters, for recovering the filtered data signals from said first and second high-pass filters in said transmitter unit and outputting a second signal.

2. A system as set forth in claim 1, wherein said receiver unit further comprises a filter means for extracting the leakage carrier from the transmission signal, to be used for performing the synchronous detection.

3. A system as set forth in claim 2, wherein the carrier recovery circuit comprises:
  a band-pass filter, as said filter means, for extracting the leakage carrier;

a variable phase shifter, operatively connected to receive at its input, the output from said band-pass filter, for providing an output;

a $\pi/2$ phase shifter operatively connected to said variable phase shifter;

a first mixer, operatively connected to said variable phase shifter, for receiving the output from said variable phase shifter and demodulating the I-ch data signal;

a second mixer, operatively connected to said variable phase shifter, for receiving the output from said variable phase shifter and demodulating the Q-ch data signal when said DC offset is added to the I-ch data signal and for providing a demodulated output;

a third low pass filter, operatively connected to said second mixer, for filtering the demodulated output from said second mixer and outputting a filtered signal; and a first DC amplifier, operatively connected to said third low-pass filter, for DC amplifying the filtered output signal from said third low-pass filter, and for controlling the phase shift operation in said variable phase shifter by being feedback-controlled with the output from said first DC amplifier.

4. A system as set forth in claim 3, wherein said receiver unit further comprises first and second base band amplifiers, respectively, operatively connected to said first and second low-pass filters and wherein said first low-pass filter and said second low-pass filter in said receiver unit, have inverse characteristic transfer functions relative to the first and second characteristic transfer functions of said first high-pass filter and said second high-pass filter in said transmitter unit, respectively.

5. A system as set forth in claim 4, wherein a first feedback path is connected between said first low-pass filter and said first base band amplifier and a second feedback path is connected between said second low-pass filter and said second base band amplifier.

6. A system as set forth in claim 5, wherein said first mixer outputs a cosine wave component when said DC offset is added to said I-ch data signal and wherein said receiver unit further comprises an automatic level control (ALC) circuit, operatively connected to said first mixer and operatively connected to receive said transmission signal, for detecting the level of the cosine wave component appearing at the output of said first mixer when said DC offset is added to said I-ch data signal and performing an ALC operation in accordance with the detected cosine wave component level.

7. A system as set forth in claim 6, wherein said ALC circuit comprises:

a fourth low-pass filter, operatively connected to said first mixer, for extracting the cosine wave component from the output of said first mixer;

a second DC amplifier, operatively connected to said fourth low-pass filter, for amplifying the output from said fourth low-pass filter;

a variable gain amplifier, operatively connected to said second DC amplifier, for providing gain-control in accordance with the output from said DC amplifier; and a subtractor, operatively connected to said variable gain amplifier and said second DC amplifier, for producing a voltage difference between a predetermined reference gain control voltage, inherent to said variable gain amplifier, and the output voltage of said second DC amplifier and providing the gain control operation for said variable gain amplifier in accordance with the produced voltage difference.

8. A system as set forth in claim 1, wherein said carrier recovery circuit is a phase locked loop (PLL) circuit in which the leakage carrier component to be used for the synchronous detection is a feedback signal such that said carrier recovery circuit does not positively extract the leakage carrier from said transmission signal.

9. A system as set forth in claim 8, wherein said carrier recovery circuit comprises:

a bandpass filter for extracting the leakage carrier from the transmission signal;

a variable phase shifter, operatively connected to receive the output from said bandpass filter, for providing an output;

a $\pi/2$ phase-shifter operatively connected to said variable phase shifter;

a first mixer, operatively connected to said variable phase shifter, for receiving the output from said variable phase shifter and demodulating the I-ch data signal; and a second mixer, operatively connected to said variable phase shifter, for receiving the output from said variable phase shifter and demodulating the Q-ch data signal when said DC offset is added to the I-ch data signal and for providing a demodulated output; and wherein said PLL circuit comprises:

a third low-pass filter, operatively connected to said second mixer, for extracting a leakage component from the demodulated output from said second mixer and outputting a filtered signal;

an amplifier, operatively connected to said third low-pass filter, for amplifying the filtered signal from said third low-pass filter and outputting an amplified signal; and a voltage-controlled oscillator, operatively connected to said amplifier, having an oscillation frequency controlled by the amplified output signal from said amplifier, for providing an oscillation output applied, via said $\pi/2$ phase shifter, to said second mixer and to said first mixer.

10. A system as set forth in claim 9, wherein said receiver unit further comprises first and second base band amplifiers operatively connected to receive said first and second mixer outputs from said first and second low-pass filters, respectively, and wherein said first low-pass filter and said second low-pass filter, in said receiver unit, have inverse characteristic transfer functions relative to the characteristic transfer functions of said first high-pass filter and said second high-pass filter, in said transmitter unit, the outputs from said first and second low-pass filters being amplified by said first and second base band amplifiers, respectively.

11. A system as set forth in claim 10, wherein a first feedback path is established between said first low-pass filter and said first base band amplifier and a second feedback path is established between said second low-pass filter and said second base band amplifier.

12. A system as set forth in claim 11, wherein said first mixer outputs a cosine wave component when said DC offset is added to said I-ch data signal and wherein said receiver unit further comprises an automatic level control (ALC) circuit, operatively connected to said transmitter unit, for receiving said transmission signal, for detecting the level of the cosine wave component appearing at the outut of said first mixer when said DC offset is added to the I-ch data signal and for providing an ALC operation in accordance with the detected cosine wave component level.

13. A system as set forth in claim 12, wherein said ALC circuit comprises:
- a fourth low-pass filter, operatively connected to said first mixer, for detecting and extracting the cosine wave component from the output of said first mixer and outputting a low pass output signal;
- a DC amplifier, operatively connected to said fourth low-pass filter, for amplifying the low-pass output signal from said fourth low-pass filter and outputting an output voltage;
- a variable gain amplifier, operatively connected to said DC amplifier, being gain controlled in accordance with the output voltage from said DC amplifier; and
- a subtractor, operatively connected to said DC amplifier and said variable gain amplifier, for producing a voltage difference between a predetermined reference gain control voltage inherent to said variable gain amplifier and the output voltage of said DC amplifier and providing the gain control operation for said variable gain amplifier in accordance with the produced voltage difference.

* * * * *

UNITED STATES PATENT AND TRADEMARK OFFICE
CERTIFICATE OF CORRECTION

PATENT NO. : 4,581,748
DATED : APRIL 8, 1986
INVENTOR(S) : SUSUMU SASAKI ET AL.

It is certified that error appears in the above-identified patent and that said Letters Patent is hereby corrected as shown below:

Col. 3, line 29, "which carrier CR'" should be --carrier CR' which--.

Col. 4, line 39, "a" (first occurrence) should be --$\underline{a}$--; "b" should be --$\underline{b}$--;
line 59, "a" should be --$\underline{a}$--.

Col. 5, line 64, "x(t)" should be --x(t))--.

Col. 6, line 21, "the 222" should be --the filter 222--;
line 22, delete "filter";
line 36, after "suppress" insert --the--.

Col. 7, line 64, "(210)." should be --(218).--.

Col. 9, line 20, "a" should be --$\underline{a}$--;
line 21, "b" should be --$\underline{b}$--;
line 26, "a" should be --$\underline{a}$--;
line 28, "b" should be --$\underline{b}$--.

Col. 12, line 52, "filter," should be --filter--.

Signed and Sealed this

Twenty-second Day of July 1986

[SEAL]

Attest:

DONALD J. QUIGG

Attesting Officer

Commissioner of Patents and Trademarks